(12) United States Patent
Lin et al.

(10) Patent No.: US 10,447,829 B2
(45) Date of Patent: Oct. 15, 2019

(54) FOLDABLE MOBILE TERMINAL

(71) Applicant: GUANGDONG OPPO MOBILE TELECOMMUNICATIONS CORP., LTD., Dongguan, Guangdong (CN)

(72) Inventors: Yugui Lin, Guangdong (CN); Jiao Cheng, Guangdong (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 0 days.

(21) Appl. No.: 16/281,342

(22) Filed: Feb. 21, 2019

(65) Prior Publication Data
US 2019/0191021 A1 Jun. 20, 2019

Related U.S. Application Data

(62) Division of application No. 15/924,977, filed on Mar. 19, 2018, now Pat. No. 10,257,331.

(30) Foreign Application Priority Data

Apr. 19, 2017 (CN) .................. 2017 2 0417277 U

(51) Int. Cl.
*E05D 3/12* (2006.01)
*H04M 1/02* (2006.01)
*G06F 1/16* (2006.01)

(52) U.S. Cl.
CPC .............. *H04M 1/021* (2013.01); *E05D 3/12* (2013.01); *G06F 1/1681* (2013.01);
(Continued)

(58) Field of Classification Search
CPC ....................... H04M 1/021; H04M 1/0216
See application file for complete search history.

(56) References Cited

U.S. PATENT DOCUMENTS

| 2015/0327383 A1 | 11/2015 | Hsu |
| 2016/0011632 A1* | 1/2016 | Hsu ......................... E05D 3/122 |
| | | 16/354 |
| 2016/0201367 A1* | 7/2016 | Kato .......................... E05D 3/12 |
| | | 361/679.09 |

FOREIGN PATENT DOCUMENTS

| CN | 105259984 A | 1/2016 |
| CN | 105812509 A | 7/2016 |

(Continued)

OTHER PUBLICATIONS

European Search Report issued in corresponding European Application No. 18162543.5, dated Jun. 29, 2018 (8 pages).
(Continued)

*Primary Examiner* — Tuan H Nguyen
(74) *Attorney, Agent, or Firm* — Ladas & Parry LLP

(57) ABSTRACT

A foldable mobile terminal is provided. The foldable mobile terminal includes a rotation mechanism, a first body, a second body, and a display panel assembly. The rotation mechanism includes: a rotation assembly having a position member, a first rotation shaft rotatably coupled to the position member, a second rotation shaft rotatably coupled to the position member, and a sliding member disposed between the first rotation shaft and the second rotation shaft; a base assembly having a base body coupled to the rotation assembly, a first slide base slidably coupled to the base body, and a second slide base slidably coupled to the base body; and a connection assembly coupled to the connection member. The first body is coupled to the first slide base. The second body is coupled to the second slide base. The display panel assembly is mounted on the first body, the second body.

20 Claims, 13 Drawing Sheets

(52) U.S. Cl.
CPC ......... *H04M 1/022* (2013.01); *H04M 1/0216* (2013.01); *H04M 1/0249* (2013.01); *H04M 1/0268* (2013.01)

(56) References Cited

FOREIGN PATENT DOCUMENTS

| | | |
|---|---|---|
| CN | 205584268 U | 9/2016 |
| CN | 205812097 U | 12/2016 |
| CN | 205847346 U | 12/2016 |
| CN | 206918043 U | 1/2018 |
| TW | 201536154 A | 9/2015 |
| WO | 2016140524 A1 | 9/2016 |

OTHER PUBLICATIONS

International Search Report issued in corresponding International application No. 2018079043, dated Jun. 14, 2018 (10 pages).

* cited by examiner

FOLDABLE MOBILE TERMINAL

CROSS-REFERENCE TO RELATED APPLICATION

This application is a divisional application of U.S. patent application Ser. No. 15/924,977, filed on Mar. 19, 2018, which claims priority to a Chinese application No. 201720417277.3 filed on Apr. 19, 2017, titled "ROTATION MECHANISM AND FOLDABLE MOBILE TERMINAL". The entirety of the above-mentioned applications is hereby incorporated by reference herein.

TECHNICAL FIELD

The present disclosure relates to the field of consumer electronics in general. More particularly, and without limitation, the disclosed embodiments relate to a foldable mobile terminal.

BACKGROUND

Mobile phones with a large screen play an excellent role in improving user experience and visual effect, and possess obvious advantages particularly in business communication, playing games, watching movies and the like.

Currently, a foldable mobile phone may have a large display panel. The large display panel can satisfy demand of a user for larger screen. A size of the foldable mobile phone can be changed by folding and unfolding. Generally, a foldable mobile phone includes a flexible display panel. The flexible display panel is mounted on a foldable housing. The foldable housing includes a first housing and a second housing rotatably coupled to the first housing. Therefore, a hinge assembly configured to connect the first housing and the second housing is needed.

SUMMARY

In accordance with an aspect, in one embodiment of the present disclosure, a foldable mobile terminal is provided. The foldable mobile terminal includes a plurality of rotation mechanisms, a first body, a second body, and a display panel assembly. The rotation mechanism includes a rotation assembly, a base assembly, and a connection assembly. The rotation assembly includes a position member, a first rotation shaft rotatably coupled to the position member, a second rotation shaft rotatably coupled to the position member and separated from and parallel to the first rotation shaft, and a sliding member slidably disposed between the first rotation shaft and the second rotation shaft. The sliding member is capable of being driven to move along a direction parallel to an axis of the first rotation shaft by rotating the first rotation shaft and the second rotation. The base assembly includes a base body coupled to the rotation assembly, a first slide base slidably coupled to the base body, and a second slide base slidably coupled to the base body. The second slide base and the first slide base are located at two opposite sides of the base body. The connection assembly is coupled to the connection member, and rotatably and slidably coupled to the base body and configured to be moved by the sliding member so as to make the first slide base and the second slide base to slide relative to the base body along a direction perpendicular to the first rotation shaft. The first body is coupled to the first slide bases of the rotation mechanisms. The second body is coupled to the second slide bases of the rotation mechanisms. The display panel assembly is mounted on the first body, the second body, and the rotation mechanism.

In accordance with another aspect, in one embodiment of the present disclosure, a foldable mobile terminal is provided. The foldable mobile terminal includes a plurality of rotation mechanisms, a first body, a second body, and a display panel assembly. The rotation mechanism includes a rotation assembly, a base assembly, and a connection assembly. The rotation assembly includes a position member, a first rotation shaft rotatably coupled to the position member, a second rotation shaft rotatably coupled to the position member and separated from and parallel to the first rotation shaft, and a sliding member disposed between the first rotation shaft and the second rotation shaft. A distance between the first rotation shaft and the second rotation shaft is remained constant by the position member. The sliding member is moved along a direction parallel to an axis of the first rotation shaft by rotating the first rotation shaft and the second rotation. The base assembly includes a base body coupled to the rotation assembly, a first slide base slidably coupled to the base body, and a second slide base slidably coupled to the base body; wherein the second slide base and the first slide base are located at two opposite sides of the base body. The second slide base and the first slide base are located at two opposite sides of the base body. The connection assembly is coupled to the connection member, and rotatably and slidably coupled to the base body and configured to couple the first slide base and the second slide base to the connection member so as to make the first slide base and the second slide base to slide relative to the base body. The first body is coupled to the first slide bases of the rotation mechanisms. The second body is coupled to the second slide bases of the rotation mechanisms. The display panel assembly is mounted on the first body, the second body, and the rotation mechanism.

In accordance with still another aspect, in one embodiment of the present disclosure, a foldable mobile terminal is provided. The foldable mobile terminal includes a plurality of rotation mechanisms, a first body, a second body, and a display panel assembly. The rotation mechanism includes a rotation assembly, a base assembly, and a connection assembly. The rotation assembly includes a position member, a first rotation shaft rotatably coupled to the position member, a second rotation shaft rotatably coupled to the position member and separated from and parallel to the first rotation shaft, and a sliding member disposed between the first rotation shaft and the second rotation shaft. A distance between the first rotation shaft and the second rotation shaft is remained constant by the position member. The base assembly includes a base body coupled to the rotation assembly, a first slide base slidably coupled to the base body, and a second slide base slidably coupled to the base body; wherein the second slide base and the first slide base are located at two opposite sides of the base body. The second slide base and the first slide base are located at two opposite sides of the base body. The connection assembly is coupled to the connection member, and rotatably and slidably coupled to the base body. The first body is coupled to the first slide bases of the rotation mechanisms. The second body is coupled to the second slide bases of the rotation mechanisms. The display panel assembly is mounted on the first body, the second body, and the rotation mechanism.

BRIEF DESCRIPTION OF THE DRAWINGS

The accompanying drawings, which are incorporated in and constitute a part of this specification, illustrate exemplary embodiments of the present disclosure, and together with the description, serve to explain the principles of the disclosure.

DETAILED DESCRIPTION OF EMBODIMENTS

This description and the accompanying drawings that illustrate exemplary embodiments should not be taken as limiting. Various mechanical, structural, electrical, and operational changes may be made without departing from the scope of this description and the claims, including equivalents. In some instances, well known structures and techniques have not been shown or described in detail so as not to obscure the disclosure. Similar reference numbers in two or more figures represent the same or similar elements. Furthermore, elements and their associated features that are disclosed in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

As used herein, a "communication terminal" (or simply a "terminal") includes, but is not limited to, a device that is configured to receive/transmit communication signals via a wireline connection, such as via a public-switched telephone network (PSTN), digital subscriber line (DSL), digital cable, a direct cable connection, and/or another data connection/network, and/or via a wireless interface with, for example, a cellular network, a wireless local area network (WLAN)1 a digital television network such as a DVB-H network, a satellite network, an AM/FM broadcast transmitter, and/or another communication terminal. A communication terminal that is configured to communicate over a wireless interface may be referred to as a "wireless communication terminal," a "wireless terminal" and/or a "mobile terminal." Examples of mobile terminals include, but are not limited to, a satellite or cellular radiotelephone; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver.

Figure 1:
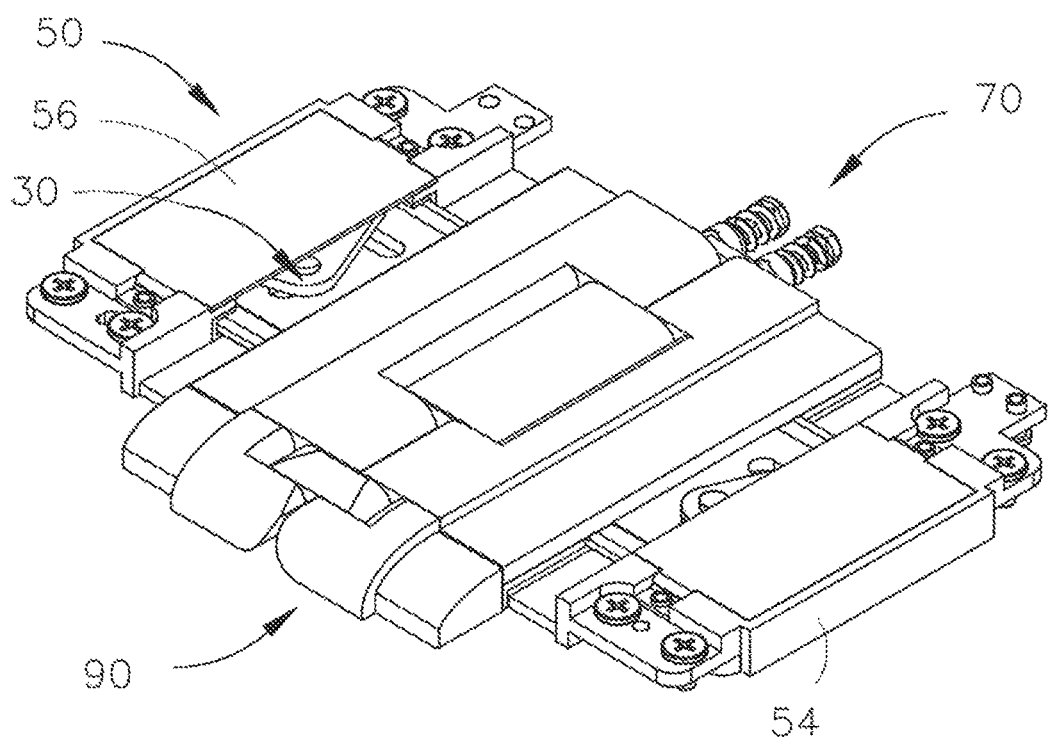
FIG. 1 illustrates a schematic view of a rotation mechanism, in accordance with an embodiment of the present disclosure.
Figure 2:
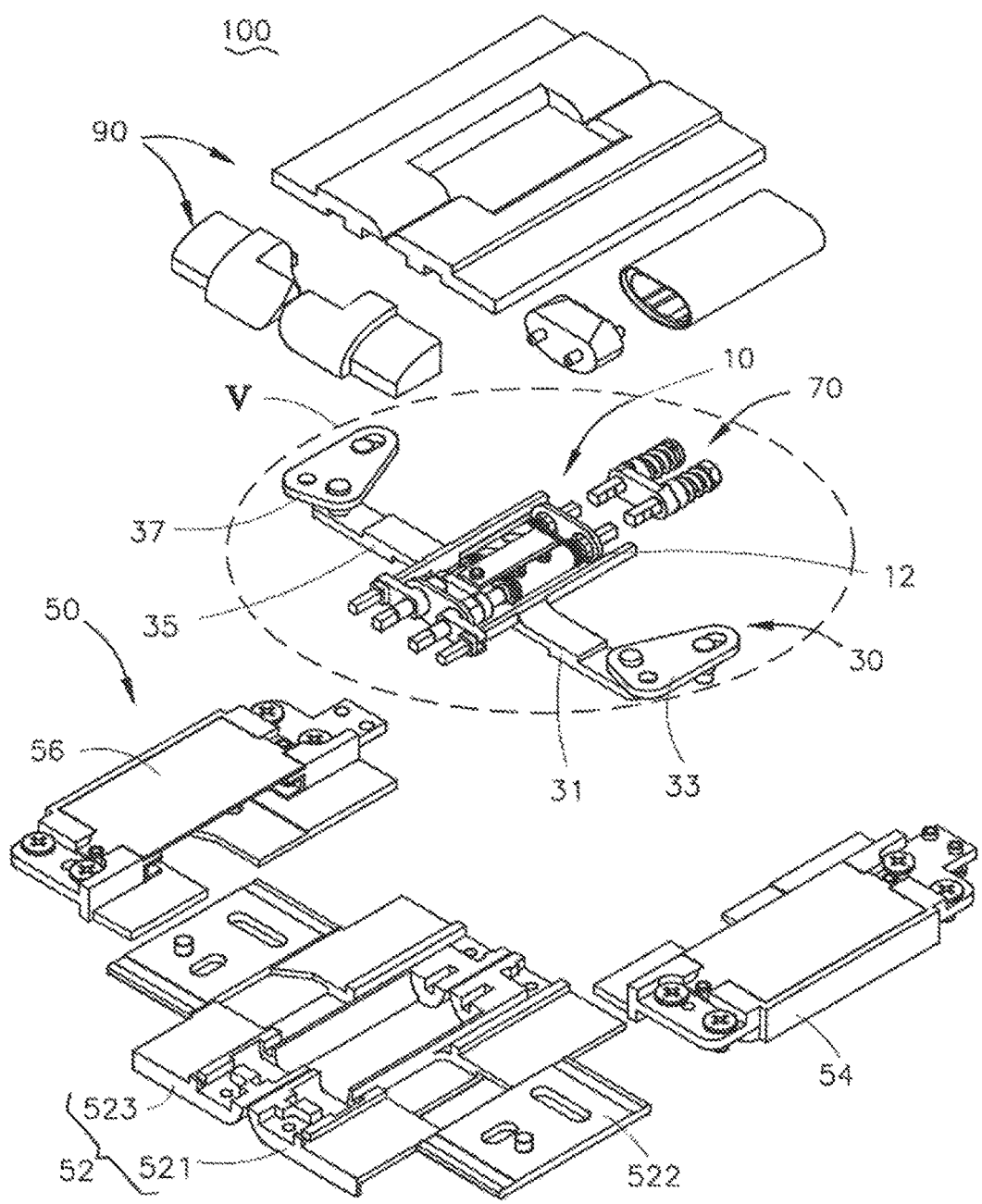
FIG. 2 illustrates an exploded view of the rotation mechanism in FIG. 1.

As illustrated in FIG. 1 and FIG. 2, the rotation mechanism 100 may include a rotation assembly 10, a connection assembly 30, a base assembly 50, and a housing assembly 90. The rotation assembly 10 is mounted on the base assembly 50. The connection assembly 30 is coupled to the rotation assembly 10. The connection assembly 30 is also mounted on the base assembly 50 and coupled to the base assembly 50. The housing assembly 90 is disposed on the base assembly 50 and configured to cover and receive the rotation assembly 10 mounted on the base assembly 50.

The base assembly 50 may include a base body 52, a first slide base 54, and a second slide base 56. The first slide base 54 can be slidably coupled to one side of the base body 52. The second slide base 56 can be slidably coupled to another side of base body 52. The first slide base 54 and the second slide base 56 are separated from each other. The first slide base 54 and the second slide base 56 can be symmetrically arranged, about the base body 52. The rotation assembly 10 can be coupled to the base body 52. The connection assembly 30 can be coupled to the rotation assembly 10, the first slide base 54, and the second slide base 56. The connection assembly 30 can be driven to move relative to the base body 52 by rotating the rotation assembly 10, thereby driving the first slide base 54 and the second slide base 56 to slide relative to the base body 52.

Figure 3:
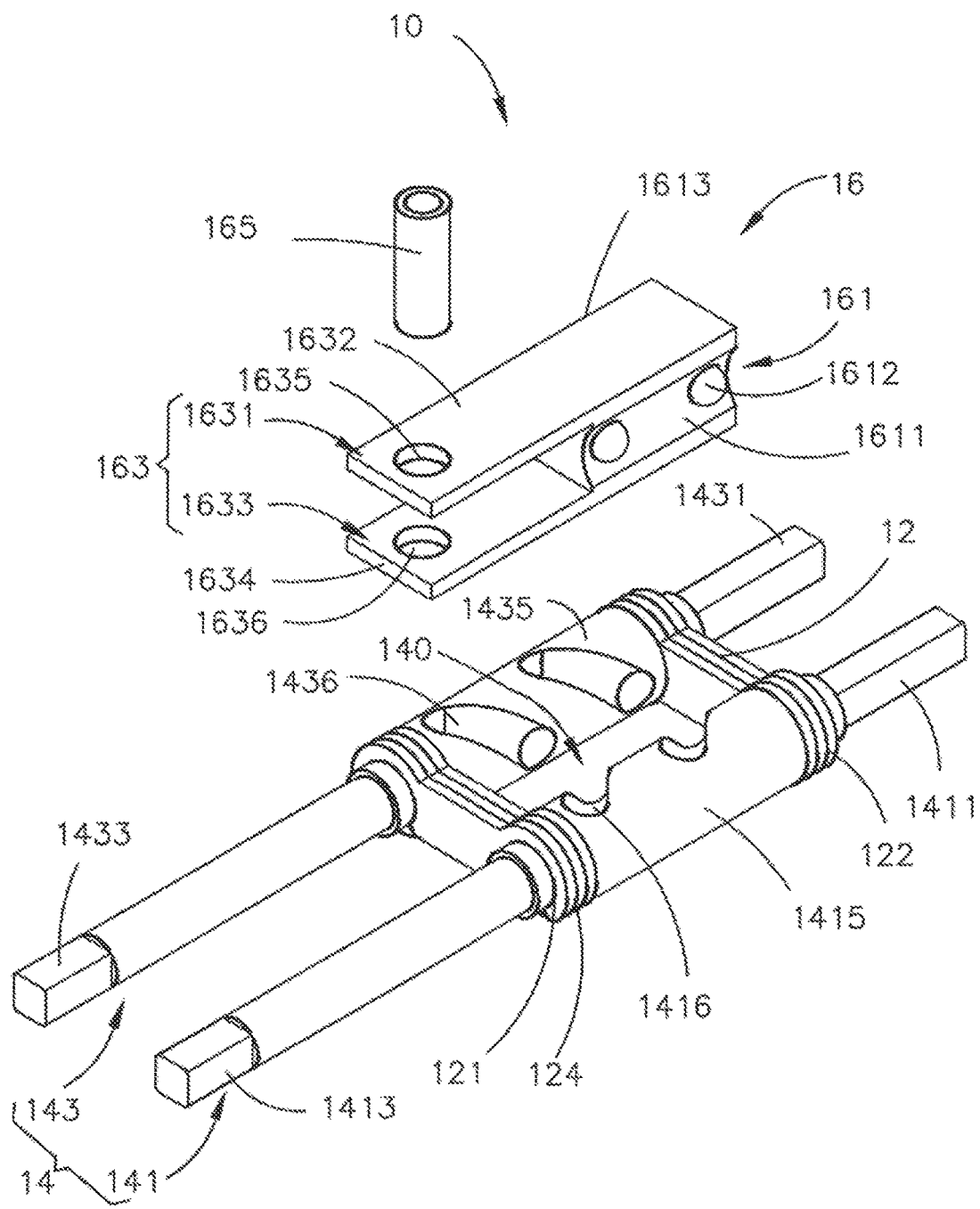
FIG. 3 illustrates an exploded view of a rotation assembly of the rotation mechanism in FIG. 2.
Figure 4:
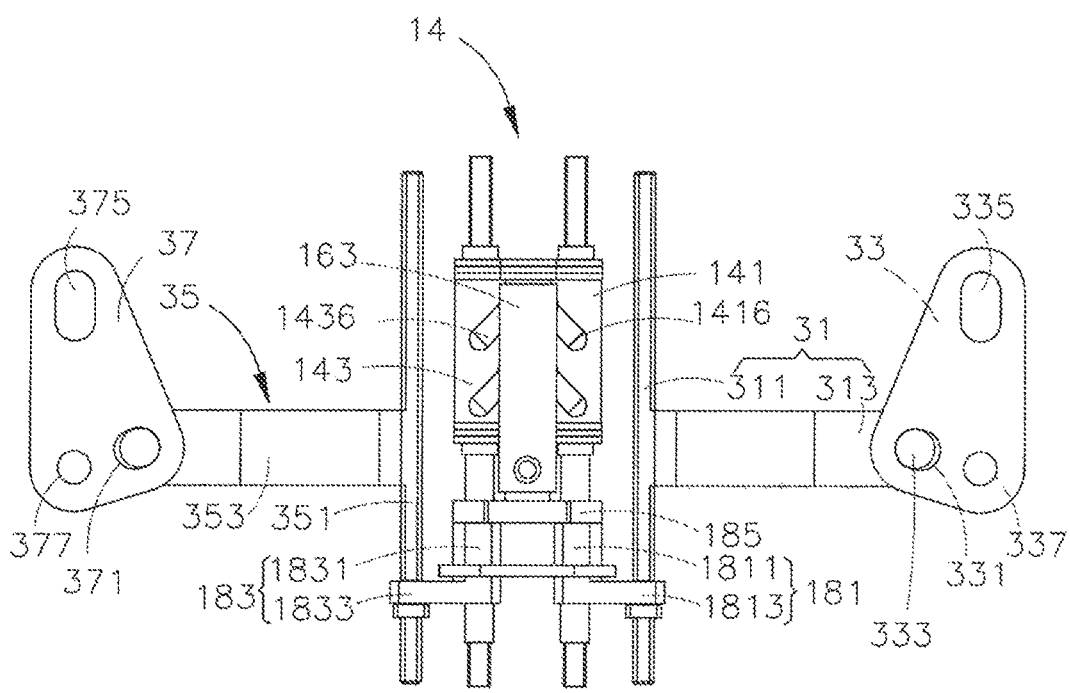
FIG. 4 illustrates a schematic view of a rotation assembly and a connection assembly of the rotation mechanism in FIG. 2.

As illustrated in FIG. 3 and FIG. 4, the rotation assembly 10 may include a rotation member 14, a positioning member 12, a sliding member 16, and a connection member 18 (see in FIG. 4). The rotation member 14 can be rotatably coupled to the positioning member 12. The sliding member 16 can be slidably coupled to the rotation member 14. The slide member 16 can be driven to slide along an axis of the rotation member 14 by rotating the rotation member 14.

In one embodiment, the rotation member 14 can include a first rotation shaft 141 and a second rotation shaft 143. The first rotation shaft 141 and the second rotation shaft 143 can be rotatably coupled to the positioning member 12. The first rotation shaft 141 and the second rotation shaft 143 are substantially parallel to each other and separated from each other. The first rotation shaft 141 can be rotated around an axis thereof relative to the position member 12, and the second rotation shaft 143 can be rotated around an axis thereof relative to the positioning member 12.

The first rotation shaft 141 can include a first part 1411, a second part 1415 and a third part 1413. The second part 1415 is located between the first part 1411 and the third part 1413. In other words, the first part 1411 is coupled to one end of the second part 1415, and the third part 1413 is coupled to the other end of the second part 1415. A cross-sectional configuration of the second part 1415 is substantially circular. A cross-sectional configuration of each of the first part 1411 and the third part 1413 is substantially square-shaped. The second part 1415 can define a number of first inclined slots 1416 on an outer surface thereof. Two first inclined slots 1416 are illustrated in the FIG. 3. In another embodiment, the second part 1415 can define one inclined slot 1416 or more than two first inclined slots 1416. An extending direction of the first inclined slots 1416 can be unparallel to the axis of the first rotation shaft 141. For example, each of the first inclined slots 1461 defined on the outer surface of the second part 1415 is spirally extended around the axis of the first rotation shaft 141. A position of one end of the first inclined slot 1416 can define one axial cross section, and a position of the other end of the first inclined slot 1416 can define the other axial cross section. An angle of the one axial cross section and the other axial cross section can be equal to or more than 90°. A rotation angle of the first rotation shaft 141 can be determined by the angle. The rotation angle of the first rotation shaft 141 can be equal to the angel (i.e., the rotation angle can be equal to or more than) 90°.

The second rotation shaft 143 is substantially similar to the first rotation shaft 141. The second rotation shaft 143 can include a first part 1431, a second part 1435, and a third part 1433. The second part 1435 can define a number of second inclined slots 1436 on an outer surface thereof and face the first inclined slots 1416. Two second inclined slots 1436 are illustrated in the FIG. 3. An extending direction of the second inclined slots 1436 can be unparallel to the axis of the second rotation shaft 143 (i.e., the axis of the first rotation shaft 141). For example, each of the second inclined slots 1436 defined on the outer surface of the second part 1435 is spirally extended around the axis of the second rotation shaft 143. A position of one end of the second inclined slot 1436 can define one axial cross section, and a position of the other end of the inclined slot 1436 can define the other axial cross section. An angle of the one axial cross section and the other axial cross section can be equal to or more than 90°. A rotation angle of the second rotation shaft 143 can be determined by the angle. The rotation angle of the second rotation shaft 143 can be equal to the angel (i.e., the rotation angle can be equal to or more than) 90°. The first inclined slots 1416 of the first rotation shaft 141 and the second inclined slots 1436 of the second rotation shaft 143 can be substantially symmetrical.

The first inclined slots 1416 and the second inclined slots 1436 are configured to be coupled to the sliding member 16. Thus, the sliding member 16 can be coupled to the first rotation shaft 141 and the second rotation shaft 143. By rotating the first rotation shaft 141, the sliding member 16 can be guided to slide in the first inclined slots 1416. Thus, the sliding member 16 can be driven to move along the axis of the first rotation shaft 141. Meanwhile, the sliding member 16 can also slide in the second inclined slots 1436, thereby rotating the second rotation shaft 143. A rotation direction of the first rotation shaft 141 is opposite to a rotation direction of the second rotation shaft 143.

In one embodiment, the positioning member 12 can include a first positioning plate 122 and a second positioning plate 124. The first positioning plate 122 and the second positioning plate 124 are separated from each other. Each of the first positioning plate 122 and the second positioning pate 124 can define two through holes 121 therein. The first rotation shaft 141 can penetrate through one of the two through holes 121, and the second rotation shaft 143 can penetrate through the other of the two through holes 121. The first rotation shaft 141 can be rotated in the corresponding through holes 121 of the first positioning plate 122 and the second positioning plate 124. The second rotation shaft 141 can also be rotated in the corresponding through holes 121 of the first positioning plate 122 and the second positioning plate 124. As mentioned above, the first rotation shaft 141 is separated from the second rotation shaft 143. A distance between the axis of the first rotation shaft 141 and the axis of the second rotation shaft 143 can remain constant by the position member 12. The first positioning plate 122, the first rotation shaft 141, the second positioning plate 124 and the second rotation shaft 143 can define a space 140 for receiving the sliding member 16. Thus, the sliding member 16 can be disposed between the first rotation shaft 141 and the second rotation shaft 143, and can be coupled to the first rotation shaft 141 and the second rotation shaft 143 so as to move along the axis of the first rotation shaft 141 (i.e., the axis of the second rotation shaft 143).

The sliding member 16 can be located between the first rotation shaft 141 and the second rotation shaft 143, and can be coupled to the first rotation shaft 141 and the second rotation shaft 143. The sliding member 16 is configured to be driven to move along the axis of the first rotation shaft 141 (i.e., the second rotation shaft 143) by rotating the first rotation shaft 141 (i.e., the second rotation shaft 143). In one embodiment, the sliding member 16 can include an engaging portion 161 and an extending portion 163 extending from the engaging portion 161.

The engaging portion 161 is located between the first rotation shaft 141 and the second rotation shaft 143. The engaging portion 161 is also between the first positioning plate 122 and the second positioning plate 124. The engaging portion 161 can include a first sidewall 1611 and a second sidewall 1613. The first sidewall 1611 and the second sidewall 1613 are located on two opposite sides of the engaging portion 161. The first sidewall 1611 may face the second part 1415 of the first rotation shaft 141, and the second sidewall 1613 may face to the second part 1435 of the second rotation shaft 143. The first sidewall 1611 can be substantially a concave surface. A curvature of the first sidewall 1611 can be equal to that of the outer surface (i.e., circumferential surface) of the second part 1415. Thus, the first sidewall 1611 can be entirely in contact with the outer surface of the second part 1415. The engaging portion 161 of the sliding member 16 will not be interference with the second part 1415 of the first rotation shaft 141 during rotating the first rotation member 14. A number of first protrusions 1612 can be formed on the first sidewall 1611. The first protrusions 1612 can be configured to be disposed in the first inclined slots 1416 correspondingly. In one embodiment, two first protrusions 1612 are illustrated in FIG. 3. The first protrusions 1612 can be engaged in the first inclined slots 1416 and can be guided to slide in the first inclined slots 1416. For example, by rotating the first rotation shaft 141, the first protrusions 1612 can slide in the first inclined slots 1416. Meanwhile, the sliding member 16 is driven to move along the axis of the first rotation shaft 141. Otherwise, by driving the sliding member 16 to move along the axis of the first rotation shaft 141, the first protrusions 1612 can slide in the first inclined slots 1316, thereby rotating the first rotation shaft 141.

The second sidewall 1613 can be substantially similar to the first sidewall 1611. A number of second protrusions (not illustrated) can be formed on the second sidewall 1613. The second protrusions can be configured to be disposed in the second inclined slots 1436 correspondingly. The second protrusions can slide in the second inclined slots 1436. For example, by rotating the second rotation shaft 143, the second protrusions can slide in the second inclined slots 1436. Meanwhile, the sliding member 16 is driven to move along the axis of the second rotation shaft 143. Otherwise, by driving the sliding member 16 to move along the axis of the second rotation shaft 143, the second protrusions can slide in the second inclined slots 1436, thereby rotating the second rotation shaft 143. The rotation direction of the first rotation shaft 141 and the rotation direction of the second rotation shaft 143 are opposite when the sliding member 16 is driven to move along the axis of the first rotation shaft 141 (i.e., the second rotation shaft 143).

In one embodiment, the extending portion 163 is extended far away from the second positioning plate 124. The extending portion 163 may include a first extending plate 1631 and a second extending plate 1633. The first extending plate 1631 and the second extending plate 1633 can be separated from each other and parallel to each other. An extending direction of the first extending plate 1631 and the second extending plate 1633 is substantially parallel to the axis of the first rotation shaft 141 (i.e., the extending direction of the first extending plate 1631 and the second extending plate 1633 is substantially parallel to the axis of the second rotation shaft 143). The first extending plate 1631 may have a first connecting end 1632 far away from the engaging portion 161. The first connecting end 1632 defines a connection hole 1635 therein. The second extending plate 1633 may have a second connecting end 1634 far away from the engaging portion 161. The second extending plate 1633 defines a connection hole 1636 therein. The first extending plate 1631 and the second extending plate 1632 are located at two opposite sides of the first positioning plate 122. That is, the first positioning plate 122 is located between the first extending plate 1631 and the second extending plate 1633. The first connecting end 1632 and the second connecting end 1634 are located outside the space 140 and between the first rotation shaft 141 and the second rotation shaft 143. A connection pin 165 can be inserted into the connection hole 1635 and the connection hole 1636 to couple the first connecting end 1632 to the second connecting end 1634.

Figure 5:
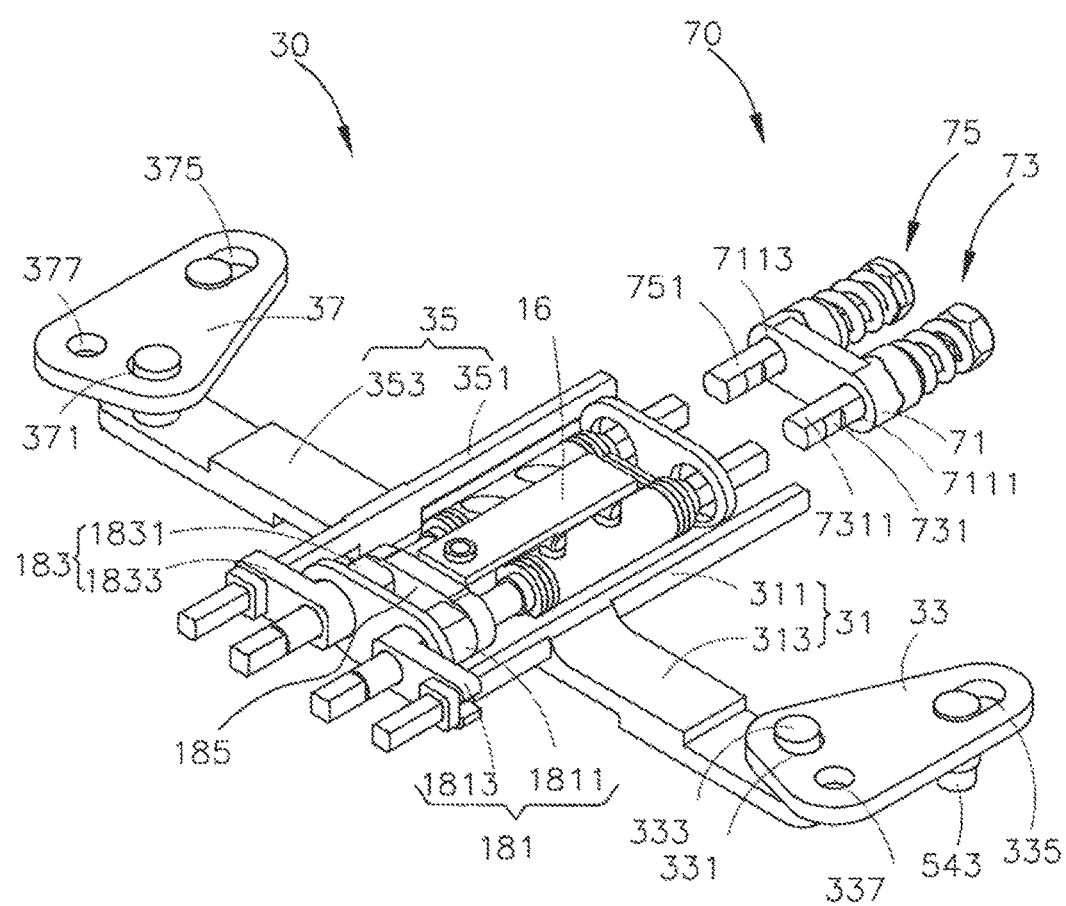
FIG. 5 illustrates an enlarged view of part V in FIG. 2.

As illustrated in FIG. 4 and FIG. 5, the connection member 18 is coupled to the sliding member 16. The connection member 18 can include a connection portion 185, a first connection group 181 and a second connection group 183. The first connection group 181 and the second connection group 183 are coupled to the connection portion 185. The connection portion 185 is coupled to the sliding member 16. For example, the connection portion 185 is located between the first connecting end 1632 and the second connecting end 1634. The connection pin 165 can also penetrate through the connection portion 185 so as to couple the connection member 18 to the sliding member 16. Thus, the first connection member 181 can be driven to move by the sliding member 16.

In one embodiment, the first connection group 181 may include a first connection arm 1811 and a second connection arm 1813 coupled to the first connection arm 1811. The first connection arm 1811 can be sleeved on the first rotation shaft 141. The first rotation shaft 141 can be rotated in the first connection arm 1811 and can slide along a longitudinal direction of the first connection arm 1811. One end of the first connection arm 1811 is coupled to the connection portion 185, the other end of the first connection arm 1811 is coupled the second connection arm 1813. The second connection arm 1813 can be substantially perpendicular to the first connection arm 1811. That is, the second connection arm 1813 is substantially perpendicular to the axis of the first rotation shaft 141. One end of the second connection arm 1813 is coupled to the first connection arm 1811; the other end of the second connection arm 1813 can be configured to be coupled to the connection assembly 30.

The second connection group 183 can be substantially similar to the first connection group 181. In one embodiment, the second connection group 183 may include a third connection arm 1831 and a fourth connection arm 1833 coupled to the third connection arm 1831. The third connection arm 1831 can be sleeved on the second rotation shaft 143. The second rotation shaft 143 can be rotated in the third connection arm 1831 and can slide along a longitudinal direction of the third connection arm 1831. One end of the third connection arm 1831 is coupled to the connection portion 185, the other end of the third connection arm 1831 is coupled the fourth connection arm 1833. The fourth connection arm 1833 can be substantially perpendicular to the third connection arm 1831. That is, the fourth connection arm 1833 is substantially perpendicular to the axis of the second rotation shaft 143. One end of the fourth connection arm 1833 is coupled to the third connection arm 1831; the other end of the fourth connection arm 1833 can be configured to be coupled to the connection assembly 30.

When the first rotation shaft 141 is rotated, the first inclined slots 1416 can guide the corresponding first protrusions 1612 on the first sidewall 1611 to slide in the first inclined slots 1416. Then, the sliding member 16 can slide along the axis of the first rotation shaft 141. Meanwhile, the second protrusions on the second sidewall 1613 can slide in the corresponding second inclined slots 1436, thereby rotating the second rotation shaft 143. A rotation direction of the first rotation shaft 141 is opposite to a rotation direction of the second rotation shaft 143. Thus, a rotation angel of the first rotation shaft 141 can be equal to a rotation angle of the second rotation shaft 143.

Similarly, when the second rotation shaft 143 is rotated, the second inclined slots 1436 can guide the corresponding second protrusions on the second sidewall 1613 to slide in the second inclined slots 1436. Then, the slide member 16 can slide along the axis of the second rotation shaft 141. Meanwhile, the first protrusions 1612 on the first sidewall 1611 can slide in the corresponding first inclined slots 1416, thereby rotating the first rotation shaft 141. A rotation direction of the first rotation shaft 141 is opposite to a rotation direction of the second rotation shaft 143. Thus, a rotation angel of the first rotation shaft 141 can be equal to a rotation angle of the second rotation shaft 143. Further, the movement of the sliding member 16 can drive the first connection group 181 and the second connection group 183 to slide along the axis of the first rotation shaft 141. Thus, the connection assembly 30 coupled to the sliding member 16 by the connection member 18 can move with the sliding member 16.

The connection assembly 30 can be coupled to the connection member 18, the first slide base 54, and the second slide base 56. The connection assembly 30 can be configured to drive the first slide base 54 and the second slide base 56 to slide relative to the base body 52.

In one embodiment, the connection assembly 30 may include a first connecting member 31, a first triangular connecting member 33, a second connecting member 35, and a second triangular connecting member 37. The first connecting member 31 can be located between and coupled to the first connection group 181 and the first triangular connecting member 33. The second connecting member 35 can be located between and coupled to the second connection group 183 and the second triangular connecting member 37. Thus, the movement of the sliding member 16 can drive the first triangular connecting member 33 and second triangular connecting member 37 to move through the connection member 181, the first connecting member 31 and second connecting member 35.

In one embodiment, the first connecting member 31 can include a first connecting rod 311 and a first connecting plate 313. The first connecting rod 311 can be substantially parallel to the first rotation shaft 141. The first connecting rod 311 is coupled to the second connecting arm 1813 of the first connection group 181. The first connecting plate 313 is substantially perpendicular to the first connecting rod 311. One end of the first connecting plate 313 is coupled to the first connecting rod 311, and the other end of the first connecting plate 313 is pivoted to the first triangular connecting member 33. The first connecting plate 313 can be coupled to a middle position of the first connecting rod 311. The first connecting rod 311 can be driven to move along the axis of the first rotation shaft 141 by the first connection member 181 during sliding the slide member 16. Thus, the first triangular connecting member 33 can be rotated relative to the first connecting plate 313.

The first triangular connecting member 33 can be substantially a triangular plate. In one embodiment, the first triangular connecting member 33 can define a first through hole 331 at a first corner thereof. A first pin 333 can be inserted through the first through hole 331 and to be coupled to the first connecting plate 313. Thus, the first triangular connecting member 33 can be rotated relative to the first connecting plate 313. The first triangular connecting member 33 can further define a second through hole 335 at a second corner thereof. The second through hole 335 can be substantially a slotted hole. The first triangular connecting member 33 can further define a third through hole 337 at a third corner thereof.

The second connecting member 35 can be substantially similar to the first transmission member 31. The second connecting member 35 and the first connecting member 31 can be symmetrical arranged about the sliding member 16. The second connecting member 31 can include a second connecting rod 351 and a second connecting plate 353. The second connecting rod 351 can be substantially parallel to the first rotation shaft 141. The second connecting rod 351 is coupled to the fourth connection arm 1833 of the second connection group 183. The second connecting plate 353 is substantially perpendicular to the second connecting rod 351. One end of the second connecting plate 353 is coupled to the second connecting rod 351, and the other end of the second connecting plate 353 is pivoted to the second triangular connecting member 35. The second connecting plate 353 can be coupled to a middle position of the second connecting rod 351. The second connecting rod 351 can be driven to move along the axis of the first rotation shaft 141 by the second connection member 183 during sliding the sliding member 16. Thus, the second triangular connecting member 35 can be rotated relative to the second connecting plate 353.

The second triangular connecting member 37 can be substantially similar to the first triangular connecting member 33. The second triangular connecting member 37 can be also pivoted to the second connecting member 35. The second triangular connecting member 37 can define a first through hole 371, a second through hole 375, and a third through hole 377 at three corners thereof respectively. A second pin 373 can be inserted through the first through hole 371 and to be coupled to the second connecting plate 353. Thus, the second triangular connecting member 35 can be rotated relative to the second connecting plate 353. The second triangular connecting member 37 and the first triangular connecting member 33 can be symmetrical arranged about the sliding member 16.

Figure 6:
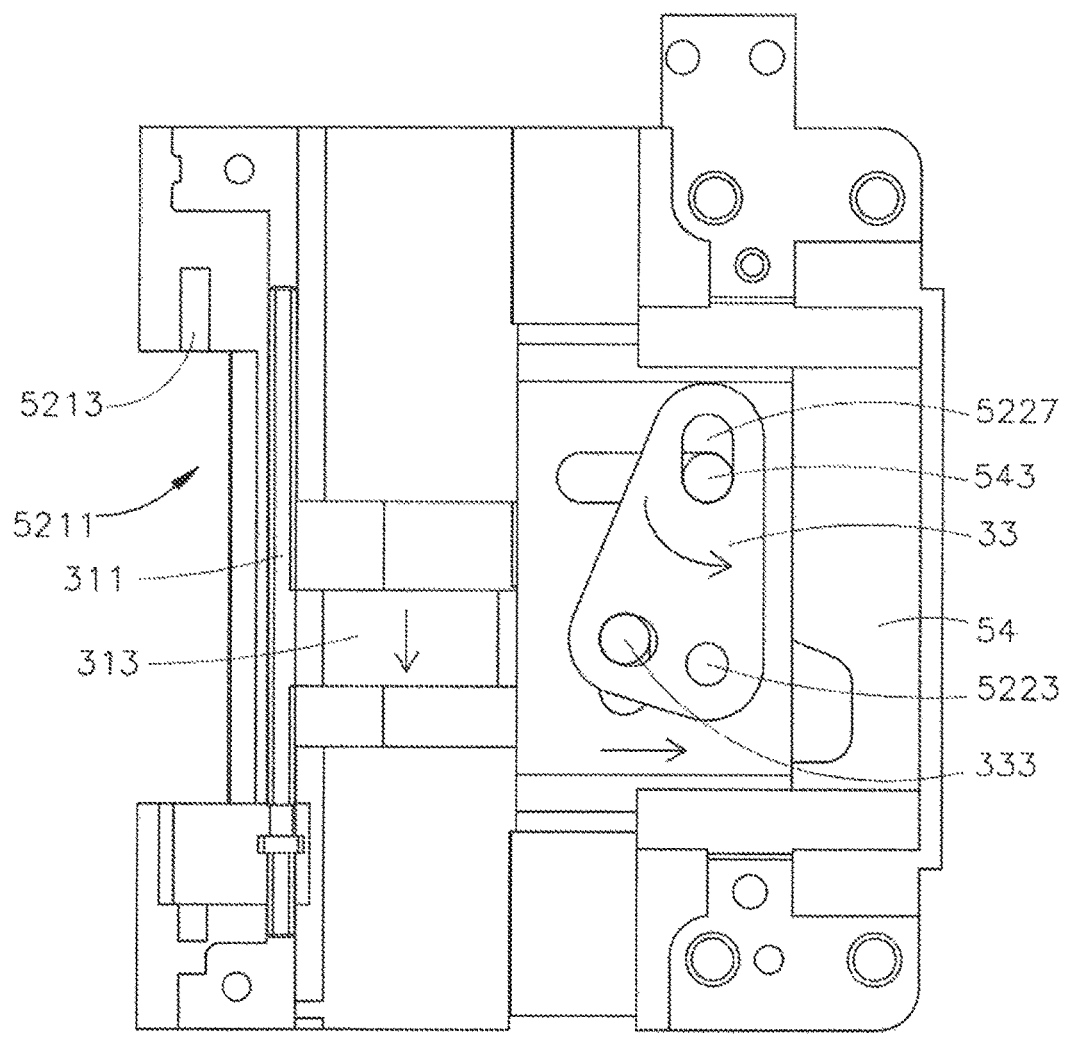
FIG. 6 illustrates a partial schematic view of a rotation assembly, a base assembly and a connection assembly of the rotation mechanism in FIG. 2.
Figure 7:
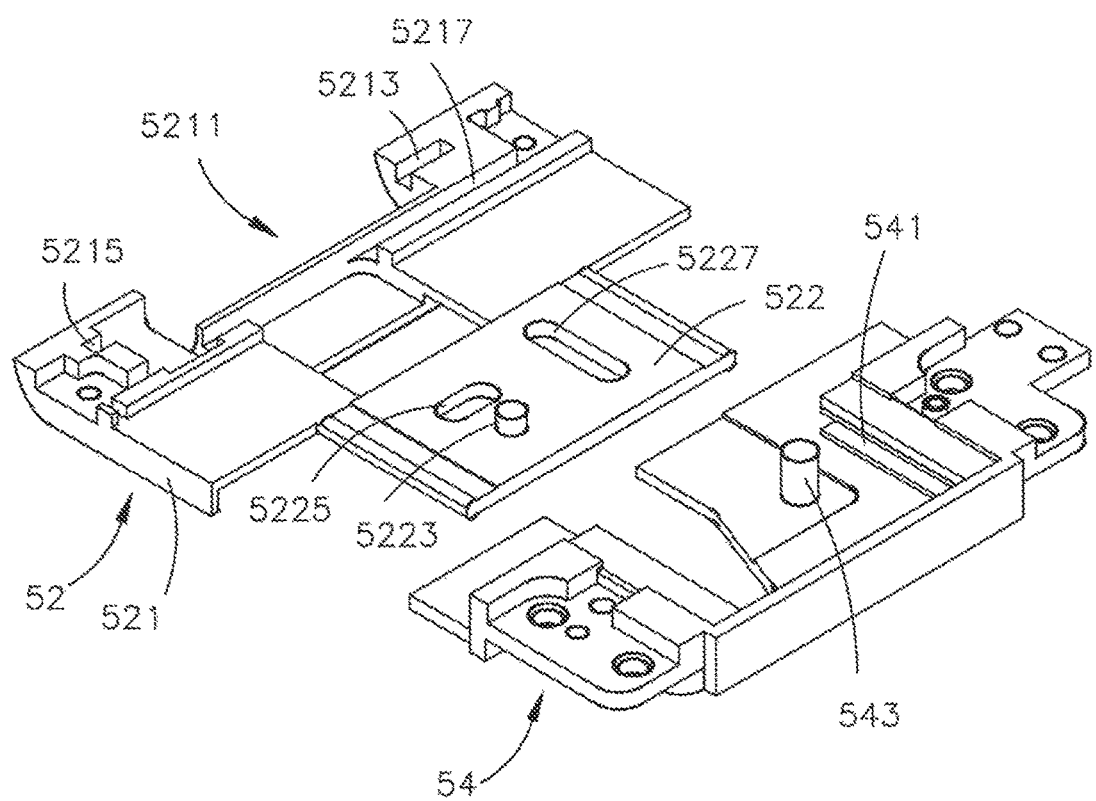
FIG. 7 illustrates an exploded view of a first base body and a first slide base of the base body in FIG. 2.

As illustrated in FIG. 2, FIG. 6 and FIG. 7, the base body 52 may include a first base body 521 and a second base body 523. The first base body 521 can be coupled to the first rotation shaft 141 (see in FIG. 2 and FIG. 4). The second base body 523 can be coupled to the second rotation shaft 143 (see in FIG. 2 and FIG. 4). The second base body 523 can be symmetrical to the first base body 521.

The first base body 521 can define a first receiving cutout 5211 at a side adjacent to the second base body 523. The first receiving cutout 5211 can be configured to partially receive the first rotation shaft 141. The first base body 521 can further define a first locking slot 5213 communicated with the first receiving cutout 5211, and a second locking slot 5215 communicated with the first receiving cutout 5211. The first locking slot 5213 and the second locking slot 5215 are located at two opposite ends of the first receiving cutout 5211 and arranged along a longitudinal direction of the first receiving cutout 5211. A cross-sectional configuration of each of the first locking slot 5213 and the second locking slot 5215 can be square-shaped. Thus, the second part 1415 of the first rotation shaft 141 can be received in the first receiving cutout 5211, the first part 1411 can be received in the first locking slot 5213, and the third part 1413 can be received in the second locking slot 5215. The first base body 521 can be rotated with respect to the second base body 523 so that the first rotation shaft 141 can be driven to rotate relative to the positioning member 12.

The first base body 521 can further define a first receiving slot 5217 adjacent to the first receiving cutout 5211. A cross-sectional configuration of the first receiving slot 5217 can be substantially square-shaped. A longitudinal direction of the first receiving slot 5217 can be substantially parallel to a longitudinal direction of the first locking slot 5213 (i.e., the longitudinal direction of the first receiving cutout 5211). The first connecting rod 311 of the first connecting member 31 can be slidably received in the first receiving slot 5217. The first connecting rod 311 can slide along the longitudinal direction of the second receiving slot 5217.

The first base body 521 may include a first guide portion 522. The first guide portion 522 can be provided at a side far away the first receiving cutout 5211 of the first base body 521. The first guide portion 522 can be configured to be engaged with the first slide base 54. A raised element 5223 can be disposed on the first guide portion 522. The raised element 5223 can be raised towards the connection assembly 30, and be rotatably inserted through the third through hole 337 of the first triangular connecting member 33. Thus, the first triangular connecting member 33 can be pivoted to the first guide portion 522.

The first guide portion 522 can define a first guide hole 5225 adjacent to the raised element 5223. The first guide hole 5225 corresponds to the first through hole 331 of the first triangular connecting member 33. The first guide hole 5225 can be located between the raised element 5223 and the first receiving cutout 5211. The first guide hole 5225 can be substantially a slotted hole. A longitudinal direction of the first guide hole 5225 is substantially parallel to the axis of the first rotation shaft 141. The first pin 333 engaging with the first through hole 331 can further penetrate through the first connecting plate 313 and be inserted into the first guiding hole 5225. Thus, the base body 52, the first connecting plate 313 and the first triangular connecting member 33 can be rotatably coupled to each other.

The first guide portion 522 can further define a second guide hole 5227 adjacent to the first guide hole 5225. The second guide hole 5227 corresponds to the second through hole 335 of the first triangular connecting member 33. The second guide hole 5227 can be substantially a slotted hole. A longitudinal direction of the second guide hole 5227 is substantially perpendicular to the axis of the first rotation shaft 141.

The second base body 523 can be substantially similar to the first base body 521. The second base body 523 can be configured to receive the second rotation shaft 143, and rotatably coupled to the second triangular connecting member 37. The second base body 523 can be substantially symmetrical to the first base body 521. The first base body 521 can be rotated with respect to the second base body 523 so that the first rotation shaft 141 and the second rotation shaft 143 can be driven to rotated relative to the positioning member 12.

The first slide base 54 can be slidably coupled to the first guide portion 522 of the first base body 52. The first slide base 54 can define a first guiding slot 541 corresponding to the first guide portion 522. The first guiding slot 541 can be configured to receive the first guide portion 522. The first guide portion 522 can be engaged in the first guiding slot 541. The first guide portion 522 can be capable of sliding in the first guiding slot 541. Thus, the first slide base 54 can slide relative to the base body 54 along a direction perpendicular to the axis of the first rotation shaft 141. A length of the base assembly 50 along a direction perpendicular to the axis of the first rotation shaft 141 can be changed.

A second pin 543 can be disposed in the first guiding slot 541. The second pin 543 can be configured to slidably couple to the first base body 521. The second pin 543 can be positioned correspondingly to the second through hole 335 of the first triangular connecting member 33 and the second guide hole 5227. The second pin 543 can penetrate through the second guide hole 5227 of the first guide portion 522, and then be inserted into second through hole 335 of the first triangular connecting member 33. Thus, the first triangular connecting member 33 can be rotatably coupled to the first slide base 54. During sliding the first connecting member 31 along the axis of the first rotation shaft 141, the first triangular connecting member 33 can be rotated around the first pin 333. A rotation force is applied to the first triangular connecting member 33 so that the first triangular connecting member 33 can be further rotated around the raised element 5223. And then, the second pin 543 can slide in the second guide hole 5227 due to the rotation of the first triangular connecting member 33. As a result, the first slide base 54 can slide relative to the first base body 521 along the direction perpendicular to the axis of the first rotation shaft 141. Thus, the length along the direction perpendicular to the axis of the first rotation shaft 141 of the base assembly 50 can be changed.

Similarly, the second slide base 56 can be coupled to the second base body 523. In one embodiment, the second slide base 56 can slidably coupled to a side of the second base body 523 far away from the first slide base 54. The second slide base 56 can be substantially similar to the first slide base 54. The second slide base 56 can be symmetrical to the first slide base 54, and can be configured to couple to the second triangular connecting member 37. When the second connecting member 35 slides along the axis of the second rotation shaft 143, the second triangular connecting member 37 can be rotated. Meanwhile, the second slide base 56 can slide relative to the base body 52 along the direction perpendicular to the axis of the second rotation shaft 143. Thus, the length along the direction perpendicular to the axis of the second rotation shaft 143 of the base assembly 50 can be changed.

A force can be applied to the base assembly 50 so that the first base body 521 can be rotated relative to the second base body 522. The first rotation shaft 141 can be rotated by the first base body 521 and the second rotation shaft 143 can be rotated by the second base body 523 in two opposite rotation directions. Meanwhile, the sliding member 16 can be driven to move along the axis of the first rotation shaft 141 by the first rotation shaft 141 and the second rotation shaft 141. The first connecting member 31 and the second connecting member 35 can move together with the sliding member 16 along the axis of the first rotation shaft 141. The first triangular connecting member 33 can be rotated around the raised element 5223, and the second triangular connecting member 37 can be rotated simultaneously. The first slide base 54 can be driven to move along the direction perpendicular to the axis of the first rotation shaft 141 by the first triangular connecting member 33; the second slide base 56 can be driven to move along the direction perpendicular to the axis of the second rotation shaft 141 by the second triangular connecting member 37. As a result, the length along the direction perpendicular to the axis of the first rotation shaft 141 of the base assembly 50 can be changed. In other words, a first distance between the first rotation shaft 141 and the first slide base 54 can be changed, and a second distance between the second rotation shaft 143 and the second slide base 56 can be changed. In addition, a rotation angle of the first rotation shaft 141 and a rotation angle of the second rotation shaft 143 can be identical during rotating the first rotation shaft 141 and the second rotation shaft 143. Thus, a movement distance of the first slide base 54 can be always identical to a movement distance of the second slide base 56. The first rotation shaft 141 and the second rotation shaft 143 can be maintained at an original position, thereby avoiding a deviation along the direction perpendicular to the first rotation shaft 141.

Figure 8:
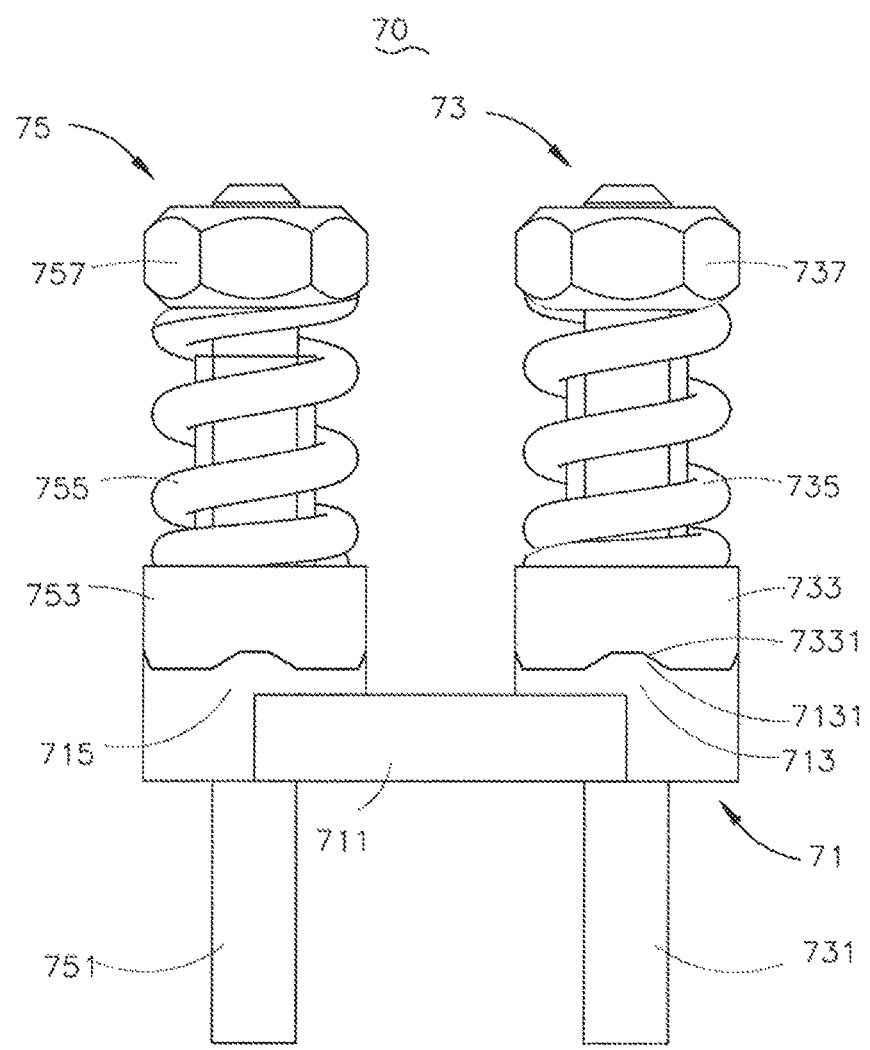
FIG. 8 illustrates a schematic view of a damping assembly of the rotation mechanism in FIG. 2.

As illustrated in FIG. 2 and FIG. 8, the rotation mechanism 100 may further include a damping assembly 70. The damping assembly 70 can be coupled to an end of the rotation assembly 10 and mounted on the first base body 521 and the second base body 523. In one embodiment, the damping assembly 70 can include a damping member 71, a first damping group 73, and a second damping group 75. The first damping group 73 and the second damping group 75 can be coupled to the base body 52. The damping member 71 can be coupled to the first damping group 73 and the second damping group 75.

In one embodiment, the first damping group 73 can be coupled to the first base body 521. The first damping group 73 can include a first slave shaft 731, a first damping element 733, a first elastic element 735, and a first blocking element 737. The first slave shaft 731 can be coupled to the first base body 521. An axis of the first slave shaft 731 can be coaxial to the axis of the first rotation shaft 141. An end of the first slave shaft 731 can be fixed to the first base body 521, thus the first slave shaft 731 can be rotated together with the first base body 521. The first damping element 733 can be sleeved on the first slave shaft 731. The first salve shaft 731 can slide along the axis thereof in the first damping element 733 and can not be rotated around the axis thereof relative to the first damping element 733. In one embodiment, the first damping element 733 can define a through hole therein. The first slave shaft 731 can be engaged in the through hole. The first damping element 733 can be rotated together with the first slave shaft 731. The first elastic element 735 can be sleeved on the first slave shaft 731, and can be located at a side of the first damping element 733 far away from the first base body 521. The first elastic element 735 is located between the first damping element 733 and the first blocking element 737. The first blocking element 737 can be fixed to an end of the first slave shaft 731 far away from the first base body 521.

The second damping group 75 can be coupled to the second base body 523. The second damping group 75 can be substantially similar to the first damping group 73. The second damping group 75 can include a second slave shaft 751, a second damping element 753, a second elastic element 755, and a second blocking element 757. The second slave shaft 751 can be coupled to the second base body 523. The second slave shaft 751 can be coaxial to the second rotation shaft 143. The second damping element 753, the second elastic element 755, and the second blocking member 757 can be sleeved on the second slave shaft 751. The second elastic element 755 is located between the second damping element 753 and the second blocking element 737. The second salve shaft 751 can slide along the axis thereof in the second damping element 753 and can be rotated around the axis thereof together with the second damping element 753. The second slave shaft 751 and the second damping element 753 can be rotated by the second base body 523.

In one embodiment, the damping member 71 can be located between the base body 52 and the first and second damping elements 733, 753. The damping member 71 can define a first round hole 7111 (see in FIG. 5) and a second round hole 7113 (see in FIG. 5). The first slave shaft 731 can be inserted through the first round hole 7111, and the second slave shaft 751 can be inserted through the second round hole 7113. The first slave shaft 731 and the second slave shaft 751 can be rotated relative to the damping member 71.

The damping member 71 can include a support portion 711, a first sleeve portion 713, and a second sleeve portion 715. The support portion 711 can be coupled to and located between the first sleeve portion 713 and the second sleeve portion 715. The first sleeve portion 713 and the second sleeve portion 715 can be separated from each other. The first slave shaft 731 can be inserted through the first sleeve portion 713. The second slave shaft 751 can be inserted through the second sleeve portion 715. The first sleeve portion 713 can have a number of protrusions 7131 at an end surface thereof towards the first damping element 733. The protrusions 7131 can be configured to engaged with the first damping element 733 of the first damping group 73. In one embodiment, the first sleeve portion 713 can have four protrusions 7131. The protrusions 7131 can be arranged along a circumferential direction of the first sleeve portion 713. That is, the protrusions 7131 are centrosymmetric about the axis of the first sleeve portion 713. One axial cross section can be defined by a position of one of the protrusions 7131 and an axis of the first sleeve 713, another axial cross section can also be defined by the axis of the first sleeve 713 and a position of another protrusion 7131 adjacent to one of the protrusions 7131 mentioned above. An angel between the one axial cross section and another axial cross section can be substantially 90 degrees.

Correspondingly, the first damping element 733 of the first damping group 73 can define a number of recesses 7331 at an end surface towards to the damping member 71. In one embodiment, the first damping element 733 can define four recesses 7331. Four first damping elements 7331 can be arranged along a circumferential direction of the first damping element 733. That is, the recesses 7331 are centrosymmetric about the axis of the first damping element 733. Each of the protrusions 7131 can be coupled with the corresponding recess 7331. When an angel between the first base body 521 and the second base body 523 is about 0 degree or 180 degrees, the protrusions 7131 can be received in the corresponding recesses 7331. Thus, the first elastic member 735 can be naturally relaxed, or can be slightly deformed. When the first base body 521 is rotated relative to the second base body 523, the first slave shaft 731 is rotated together with the first rotation shaft 141, and the second slave shaft 751 is rotated together with the second rotation shaft 143. The protrusions 7131 can move out of the corresponding recesses 7331. Thus, the first elastic element 735 and the second elastic element 755 can be compressed to generate a damping force to the first base body 521 and the second base body 523. As a result, the first base body 521 and the second base body 523 can be rotated relative to each other only in that case of an external force, and cannot be rotated by mistake. When the angel between the first base body 521 and the second base body 523 is 180 degrees or 0 degree, the protrusions 7131 can be engaged with the corresponding recesses 7331 correspondingly. A user can feel that the protrusions 7131 have been engaged with the corresponding recesses 7331.

In an alternative embodiment, an amount of the recesses 7331 and an amount of the protrusions 7131 can be other value, such as but not limited to, 2, 3, 4, 5, 6, 7, 8 . . . . The user can feel the first base body 521 has been rotated in right position relative to the second base body 523. The angle of the first base body 521 and the second body 523 can have more choices.

The housing assembly 90 can be configured to cover the connection assembly 30 and the base assembly 50. The rotation assembly 10 can be received in the housing assembly 90. The housing assembly 90 can be configured to protect the rotation assembly 10, the connection assembly 30, and the base assembly 50 and prevent external impurities from entering into the rotation mechanism 100. Further, a better appearance effect of the rotation mechanism 100 can be obtained.

Figure 9:
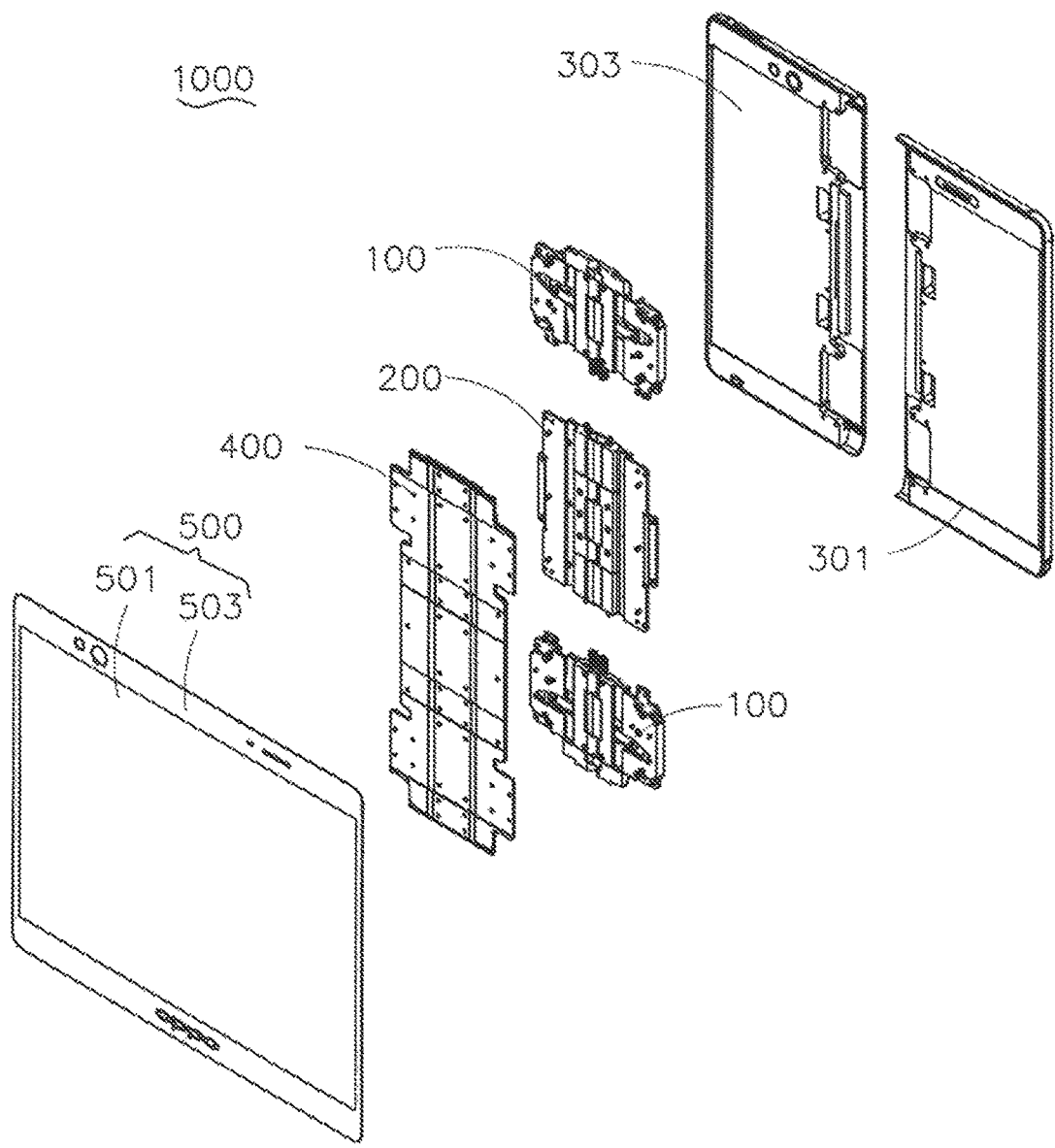
FIG. 9 illustrates an exploded view of a foldable mobile terminal, in accordance with an embodiment of the present disclosure.

As illustrated in FIG. 9, a foldable mobile terminal 1000 is provided. The foldable mobile terminal 1000 may include one or more rotation mechanism 100, one or more decorating assemblies 200, a first body 301, a second body 303, a supporting assembly 400, and a display panel assembly 500.

In one embodiment, the foldable mobile terminal 1000 can include a number of rotation assemblies 100 and a number of decorating assemblies 200. Each of the decorating assemblies 200 can be positioned between two adjacent rotation assemblies 100, and can be coupled to the two adjacent rotation assemblies 100. A configuration of the decorating assembly 200 can be substantially similar to that of the rotation assembly 100.

The first body 301 can be coupled to the first slide base 54, while the second body 303 can be coupled to the second slide base 56. The supporting assembly 400 can be stacked on the rotation assemblies 100 and the decorating assemblies 200. In one embodiment, the foldable mobile terminal 1000 includes two rotation assemblies 100 and one decorating assembly 200. The first body 301 can be coupled to the first slide bases 54 of each of the rotation assemblies 100, while the second body 303 can be coupled to the second slide bases 56 of each of the rotation assemblies 100. Thus, the first body 301 and the second body 303 can be rotated relative to each other by the rotation assemblies 100. The first slide base 54 and the second slide base 56 can slide relative the base body 52 when the first body 301 is rotated relative to the second body 303. A distance between a center line of the rotation assembly 100 and a side of the first slide base 54 away from the rotation assembly 100 can be changed, and a distance between the center line of the rotation assembly 100 and a side of the second slide base 56 away from the rotation assembly 100 can be changed. Thus, the display panel assembly 500 can be prevented from damage during folding or unfolding the foldable mobile terminal 1000. In an alternative embodiment, one or more flexible printed circuit boards (FPC) can be provided to couple to the first body 301 and the second body 303. Thus, the first body 301 and the second body 303 can communicate with each other.

Figure 10:
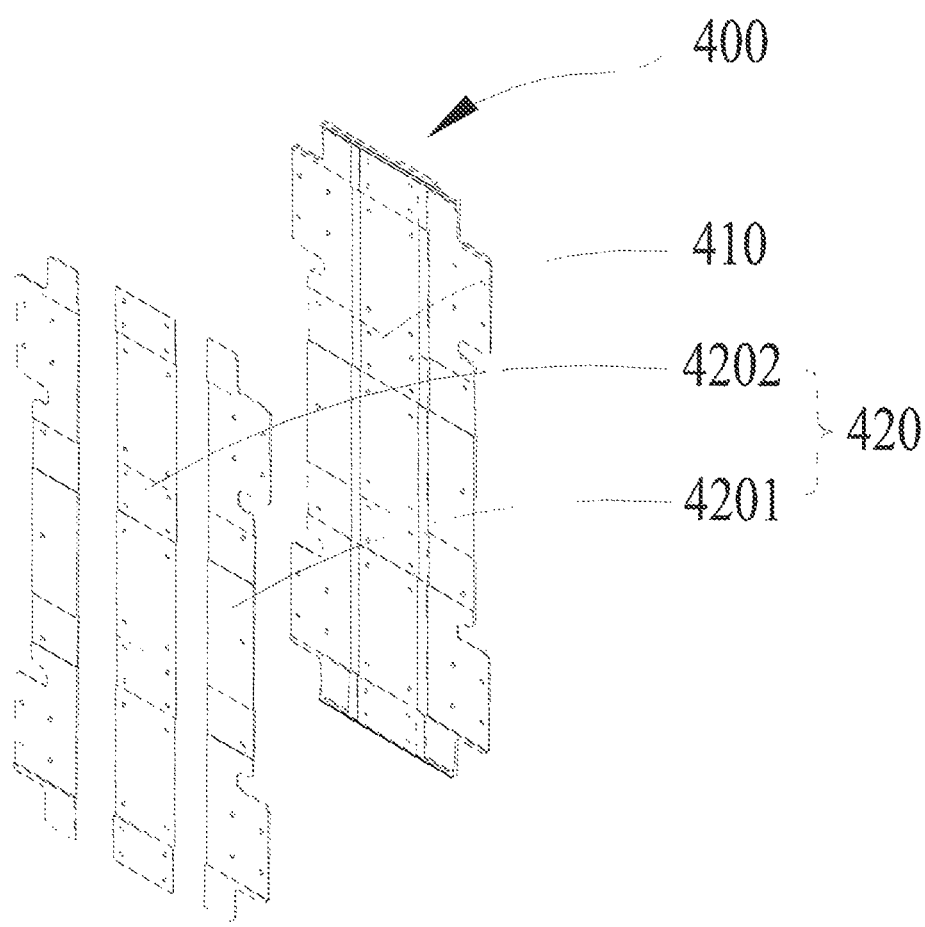
FIG. 10 illustrates a schematic view of a supporting assembly of the foldable mobile terminal in FIG. 9.

As illustrated in FIG. 10, the supporting assembly 400 can include a silicone member 410 and a supporting member 420. The supporting member 420 can be overlapped on the silicone member 410. The supporting member 420 can be formed on the silicone member 410 by in-mold decoration. The supporting member 420 can include two supporting portions 4201 and a flexible portion 4203. The flexible portion 4203 can be located between the two supporting portions 4201, and can be coupled to the two supporting portions 4201. The flexible portion 4203 can face the rotation mechanism 100. In one embodiment, each of the supporting portions 4201 can be substantially a steel plate. Each of the flexible portions 4203 can be substantially a slice of steel.

The display panel assembly 500 is mounted on the first body 301, the second body 303 and the supporting member 400. The display panel assembly 500 can include flexible display panel 501 and a flexible cover 503 (see FIG. 9). The flexible cover 503 can be overlapped on and adhered to the flexible display panel 501.

Figure 11:
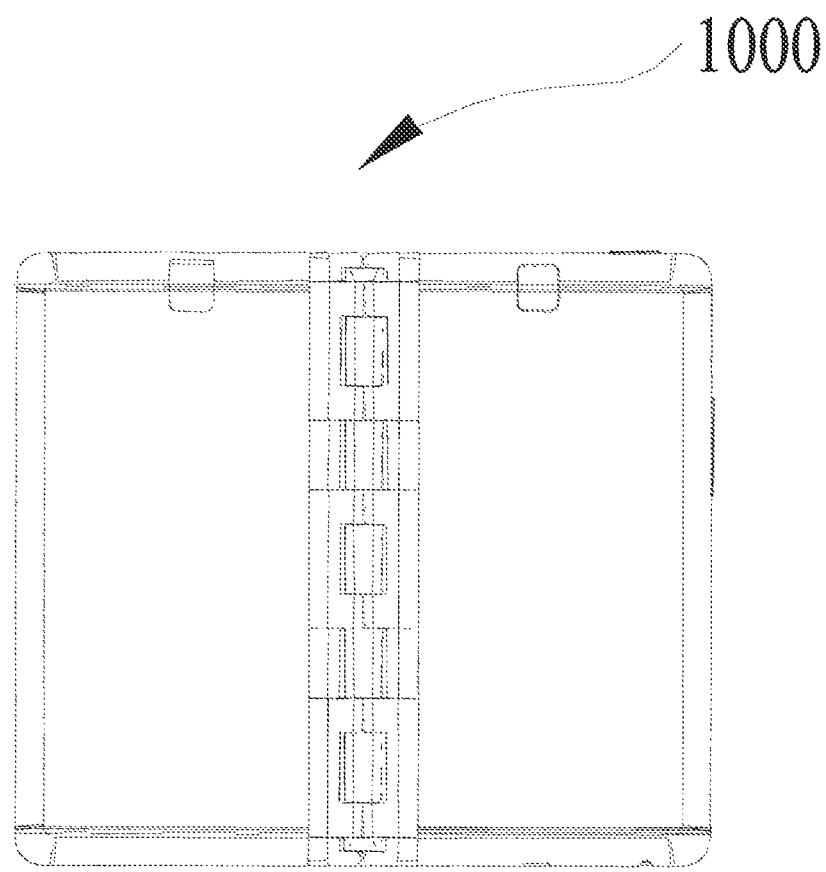
FIG. 11 illustrates the foldable mobile terminal in FIG. 10, which is in an unfolded mode.
Figure 12:
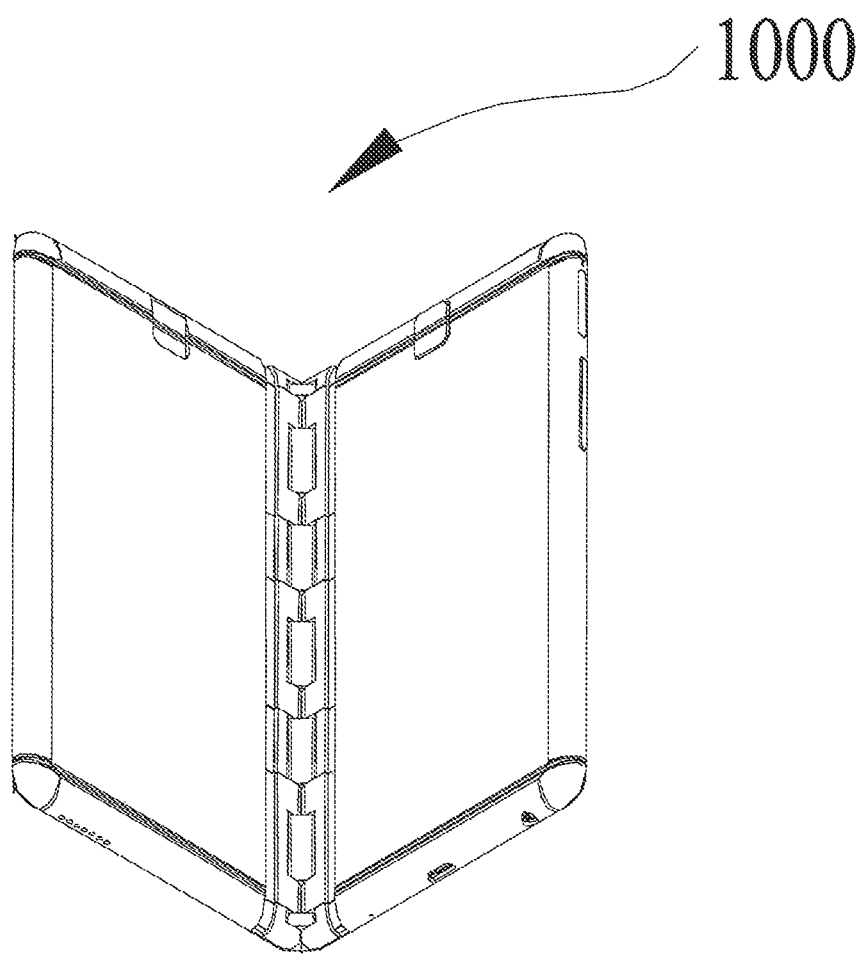
FIG. 12 illustrates the foldable mobile terminal in FIG. 10, which the foldable mobile terminal is in an angular mode.
Figure 13:
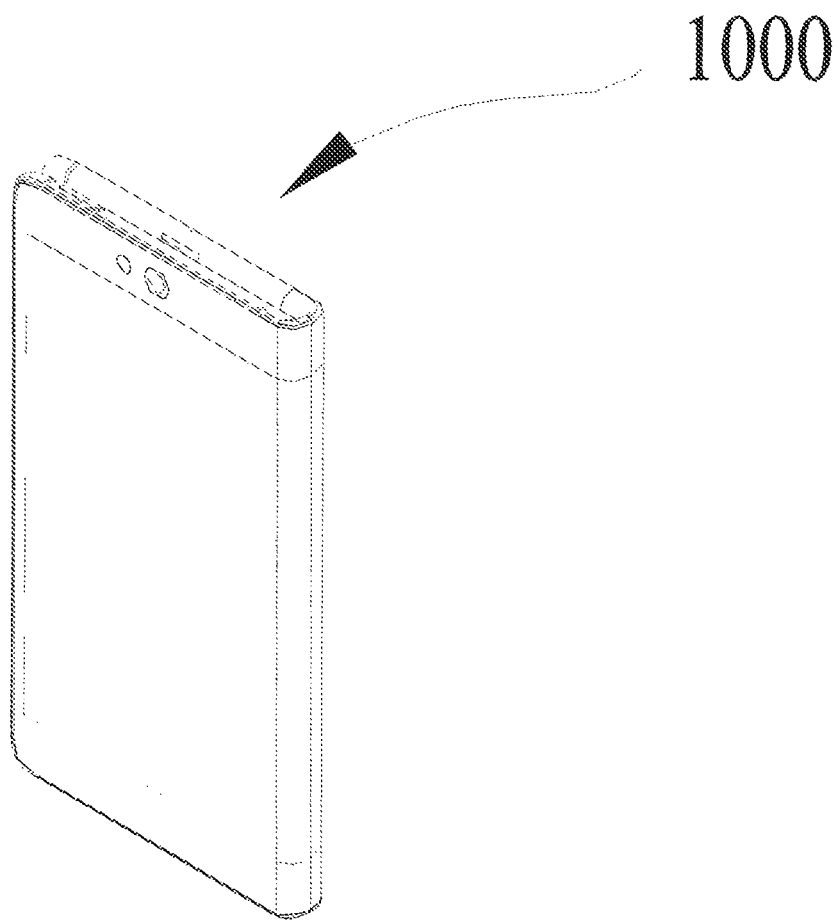
FIG. 13 illustrates the foldable mobile terminal in FIG. 10, which the foldable mobile terminal is in a folded mode.

As illustrated in FIG. 11, FIG. 12 and FIG. 13, the foldable mobile terminal 1000 can be in an unfolded mode, in an angular mode and in a folded mode. The first body 301 and the second body 303 can be rotated at the same angel and at the same time by the rotation assemblies 100.

In addition, the first body 301 and the second body 303 can be rotated relative to each other. During rotating the first body 301 and the second body 303, a linkage generated between the connection assembly 30 and the rotation assembly 10. A first distance between the center line of the rotation mechanism 100 and the side of the first slide base 54 away from the rotation mechanism 100 can be changed, and a second distance between the center line of the rotation mechanism 100 and the side of the second slide base 56 away from the rotation mechanism 100 can be changed. A change value of the first distance is substantially equal to a change value of the second distance. Thus, the rotation assembly 10 can be prevent from moving towards a side of the first body 301 or the second body 303. Further, the display panel assembly 500 will not be stretched or compressed during folding or unfolding the foldable mobile terminal 1000.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A foldable mobile terminal comprising:
    a plurality of rotation mechanisms, each one of the rotation mechanisms having:
        a rotation assembly, having: a position member, a first rotation shaft rotatably coupled to the position member, a second rotation shaft rotatably coupled to the position member and parallel to the first rotation shaft, and a sliding member disposed between the first rotation shaft and the second rotation shaft; the sliding member being moved along a direction parallel to an axis of the first rotation shaft by rotating the first rotation shaft and the second rotation;
        a base assembly, having: a base body coupled to the rotation assembly, a first slide base, slidably coupled to the base body, and a second slide base slidably coupled to the base body; wherein the second slide base and the first slide base are located at two opposite sides of the base body; and
        a connection assembly, coupled to the base body and configured to be moved by the sliding member so as to make the first slide base and the second slide base to slide relative to the base body along a direction perpendicular to the first rotation shaft;
    a first body, coupled to the first slide bases of the rotation mechanisms;
    a second body, coupled to the second slide bases of the rotation mechanisms; and
    a display panel assembly, mounted on the first body, and the second body and the rotation mechanism.

2. The foldable mobile terminal as claimed in claim 1, further comprising:
    a plurality of decorating assemblies, located between and coupled to two adjacent rotation mechanisms of the plurality rotation mechanisms; and
    a supporting assembly, stacked on the plurality of rotation mechanisms and the plurality of decorating assemblies; wherein the display panel assembly is further mounted on the supporting assembly.

3. The foldable mobile terminal as claimed in claim 2, wherein the supporting assembly comprises a silicone member and a supporting member overlapped on the silicone member; the supporting member comprises two supporting portions and a flexible portion located between the two supporting portions; the rotation assembly faces the flexible portion.

4. The foldable mobile terminal as claimed in claim 1, wherein,
    the first rotation shaft defines at least one first inclined slot; the sliding member comprises at least one first protrusion; and the at least one first protrusion is slidably engaged in the at least one first inclined slot in one-to-one correspondence;
    the second rotation shaft defines at least one second inclined slot; the sliding member comprises at least one second protrusion; and the at least one second protrusion is slidably engaged in at least one second inclined slot in one-to-one correspondence.

5. The foldable mobile terminal as claimed in claim 1, further comprising a connection member coupled to the sliding member and the connection assembly; wherein the connection assembly is configured to couple the first slide base and the second slide base to the connection member so as to make the first slide base and the second slide base to slide relative to the base body.

6. The foldable mobile terminal as claimed in claim 5, wherein the connection member comprises:
    a connection portion, coupled to the sliding member;
    a first connection group, coupled to the connection portion; the first connection group having a first connection arm slidably sleeved on the first rotation shaft, and a second connection arm perpendicular to the first rotation shaft; and
    a second connection group, coupled to the connection portion; the second connection group having a third connection arm slidably sleeved on the first rotation shaft, and a fourth connection arm perpendicular to the first rotation shaft;

wherein the connection assembly is coupled to the second connection arm of the first connection group and the fourth connection arm of the second connection group.

7. The foldable mobile terminal as claimed in claim 5, wherein the connection assembly comprises:
a first connecting member, coupled to the connection member;
a first triangle connecting member, rotatably coupled to the first connecting member and the base body;
a second connecting member, coupled to the connection member; and
a second triangle connecting member, rotatably coupled to the second connecting member and the base body;
wherein a corner of the first triangle connecting member is rotatably coupled to the first slide base, and a corner of the second triangle connecting member is rotatably coupled to the second slide base.

8. The foldable mobile terminal as claimed in claim 7, wherein the first connecting member comprises:
a first connecting rod, coupled to the connection member and parallel to the first rotation shaft; and
a first connecting plate, perpendicular to the first connecting rod; wherein one end of the first connecting plate is coupled to the first connecting rod; the other end of first connecting plate is rotatably coupled to the first triangle connecting member.

9. The foldable mobile terminal as claimed in claim 7, wherein the second connecting member comprises:
a second connecting rod, coupled to the connection member and parallel to the second rotation shaft; and
a second connecting plate, perpendicular to the second connecting rod; wherein one end of the second connecting plate is coupled to the second connecting rod; the other end of second connecting plate is rotatably coupled to the second triangle connecting member.

10. The foldable mobile terminal as claimed in claim 1, wherein the base body comprises:
a first base body, coupled to the first rotation shaft; and
a second base body, coupled to the second rotation shaft;
wherein the first base body and the second base body is symmetrically arranged; the first slide base is slidably coupled to the first base body; the second slide base is slidably coupled to the second base body; a move direction of the first slide base and a move direction of the second slide base are perpendicular to the first rotation shaft.

11. The foldable mobile terminal as claimed in claim 10, wherein the rotation mechanism further comprises a damping assembly coupled to the first base body and the second base body; the damping assembly is configured to generate a damping force to the first base body and the second base body during rotating the first base body relative to the second base body.

12. The foldable mobile terminal as claimed in claim 11, wherein the damping assembly comprises:
a first damping group, coupled to the first base body; the first damping group having: a first slave shaft coupled to the first base body, a first damping element slidably sleeved onto the first slave shaft and configured to be rotated together with the first slave shaft, a first blocking element fixed to the first slave shaft, and a first elastic element located between the first damping element and the first blocking member;

a second damping group, coupled to the second base body; the second damping group having: a second slave shaft coupled to the second base body, a second damping element slidably sleeved onto the second slave shaft and configured to be rotated together with the second slave shaft, a second blocking element fixed to the second slave shaft, and a second elastic element located between the second damping element and the second blocking member; and
a damping member, penetrated through by the first slave shaft and the second slave shaft, and coupled to the first damping element of the first damping group and the second damping element of the second damping group;
wherein the damping member comprises a plurality of protrusions towards the first damping element and the second damping element, each of the first damping element and the second damping element defining a plurality of recesses corresponding to the plurality of protrusions, each of the plurality of protrusions is configured to be engaged in one of the protrusions recesses.

13. The foldable mobile terminal as claimed in claim 1, wherein the rotation mechanism further comprises a housing assembly; the housing assembly covers the base body; the rotation assembly is received in the housing assembly.

14. A foldable mobile terminal comprising:
a rotation mechanism having:
a rotation assembly, having: a position member, a first rotation shaft rotatably coupled to the position member, a second rotation shaft rotatably coupled to the position member and separated from and parallel to the first rotation shaft, and a sliding member disposed between the first rotation shaft and the second rotation shaft; a distance between the first rotation shaft and the second rotation shaft remaining constant by the position member; the sliding member being moved along a direction parallel to an axis of the first rotation shaft by rotating the first rotation shaft and the second rotation;
a base assembly, having: a base body coupled to the rotation assembly, a first slide base slidably coupled to the base body, and a second slide base slidably coupled to the base body; wherein the second slide base and the first slide base are located at two opposite sides of the base body; and
a connection assembly, coupled to the connection member, and rotatably and slidably coupled to the base body; the connection assembly being configured to couple the first slide base and the second slide base to the connection member so as to make the first slide base and the second slide base to slide relative to the base body;
a first body, coupled to the first slide base;
a second body, coupled to the second slide base; and
a display panel assembly, mounted on the first body, and the second body and the rotation mechanism.

15. The foldable mobile terminal as claimed in claim 14, wherein the connection assembly comprises:
a first connecting member, coupled to the connection member;
a first triangle connecting member, rotatably coupled to the first connecting member and the base body;
a second connecting, member, coupled to the connection member; and
a second triangle connecting member, rotatably coupled to the second connecting member and the base body;

wherein a corner of the first triangle connecting member is rotatably coupled to the first slide base, and a corner of the second triangle connecting member is rotatably coupled to the second slide base.

16. The foldable mobile terminal as claimed in claim 14, wherein, the first rotation shaft defines at least one first inclined slot; the sliding member comprises at least one first protrusion; and the at least one first protrusion is slidably engaged in the at least one first inclined slot in one-to-one correspondence;

the second rotation shaft defines at least one second inclined slot; the sliding member comprises at least one second protrusion; and the at least one second protrusion is slidably engaged in at least one second inclined slot in one-to-one correspondence.

17. The foldable mobile terminal as claimed in claim 14, further comprising a connection member coupled to the sliding member and the connection assembly; wherein the connection assembly is configured to couple the first slide base and the second slide base to the connection member so as to make the first slide base and the second slide base to slide relative to the base body.

18. The foldable mobile terminal as claimed in claim 14, wherein the base body comprises:

a first base body, coupled to the first rotation shaft; and a second base body, coupled to the second rotation shaft;

wherein the first base body and the second base body is symmetrically arranged; the first slide base is slidably coupled to the first base body; the second slide base is slidably coupled to the second base body; a move direction of the first slide base and a move direction of the second slide base are perpendicular to the first rotation shaft.

19. A foldable mobile terminal comprising:

a rotation mechanism having:

a rotation assembly, having: a position member, a first rotation shaft rotatably coupled to the position member, a second rotation shaft rotatably coupled to the position member and separated from and parallel to the first rotation shaft, and a sliding member disposed between the first rotation shaft and the second rotation shaft; a distance between the first rotation shaft and the second rotation shaft remaining constant by the position member;

a base assembly, having: a base body coupled to the rotation assembly, a first slide base slidably coupled to the base body, and a second slide base slidably coupled to the base body; wherein the second slide base and the first slide base are located at two opposite sides of the base body; and a connection assembly, coupled to the connection member, and rotatably and slidably coupled to the base body;

a first body, coupled to the first slide base;

a second body, coupled to the second slide base; and a display panel assembly, mounted on the first body, and the second body and the rotation mechanism.

20. The foldable mobile terminal as claimed in claim 19, wherein the connection assembly comprises:

a first connecting member, coupled to the connection member;

a first triangle connecting member, rotatably coupled to the first connecting member and the base body;

a second connecting member, coupled to the connection member; and a second triangle connecting member, rotatably coupled to the second connecting member and the base body;

wherein a corner of the first triangle connecting member is rotatably coupled to the first slide base, and a corner of the second triangle connecting member is rotatably coupled to the second slide base.

* * * * *